US005323323A

United States Patent [19]

Gilham

[11] Patent Number: 5,323,323

[45] Date of Patent: Jun. 21, 1994

[54] FRANKING MACHINE SYSTEM

[75] Inventor: Dennis T. Gilham, Brentwood, United Kingdom

[73] Assignee: Neopost Limited, Essex, United Kingdom

[21] Appl. No.: 155,245

[22] Filed: Nov. 22, 1993

Related U.S. Application Data

[63] Continuation of Ser. No. 724,852, Jul. 2, 1991, abandoned, which is a continuation-in-part of Ser. No. 216,180, Jul. 7, 1988, abandoned.

[30] Foreign Application Priority Data

Jul. 9, 1987 [GB] United Kingdom ................ 8716184

[51] Int. Cl.[5] ................ G06F 15/20

[52] U.S. Cl. ................ 364/464.02; 235/375; 235/419

[58] Field of Search ................ 364/464.02, 466, 478; 235/375, 376, 385, 419, 425, 431; 379/93, 94, 102, 104, 106, 107

[56] References Cited

U.S. PATENT DOCUMENTS 4,511,793 4/1985 Racanelli ................ 364/466
4,725,718 2/1988 Sansone et al. ................ 235/495
4,752,950 6/1988 Le Carpentier ................ 364/464.02
4,760,534 7/1988 Fougere et al. ................ 364/466
4,796,196 1/1989 Durst, Jr. et al. ................ 364/478
4,812,992 3/1989 Storace et al. ................ 364/464.02

*Primary Examiner*—Vincent N. Trans
*Attorney, Agent, or Firm*—Shoemaker and Mattare, Ltd.

[57] ABSTRACT

A franking machine system is disclosed in which a master controller is provided to communicate with a postal authority resetting center and with a plurality of franking machines. The controller includes registers for storing the value of credit available for distribution to the franking machines and registers for storing data relating to usage of the individual franking machines. Credit is obtained from the resetting center by the controller and is distributed to the franking machines as required by each machine.

7 Claims, 4 Drawing Sheets

FRANKING MACHINE SYSTEM

CROSS REFERENCES TO RELATED APPLICATIONS

This application is a continuation of application Ser. No. 07/724,852, filed Jul. 2, 1991 now abandoned, which is a continuation in part of co-pending application Ser. No. 07/216,180 filed 7 Jul. 1988 now abandoned.

BACKGROUND OF THE INVENTION

This invention relates to a franking machine system for updating the credit available in a franking machine for franking mail items and in particular to a system for updating the credit available in a plurality of franking machines. The invention also relates to a controller for use in such a system.

Commonly, franking machines for franking mail items are provided with means to store a value of credit available for use in franking items and as franking takes place the credit value is decremented to correspond to the remaining credit available for use. When the credit has been decremented to a predetermined minimum value the franking machine is rendered inoperative to carry further franking of items. For reasons of security and to prevent fraudulent use of the franking machine, the part of the machine for carrying out accounting functions and for storing data relating to the use of the machine, including the value of credit available, is contained within a sealed secure housing. Access to this part of the machine by the user is not authorized and updating of the credit value available can only be carried out by the postal authority. Previously it has been necessary for the user to take the machine, or at least that part of the machine which carries out accounting functions and stores the credit value, to the postal authority and upon payment by the user the postal authority accesses the machine to enter a new value of credit and then reseals the machine. In order to overcome the inconvenience of needing to physically transport a part of the franking machine to the postal authority it has been proposed to accomplish the operation of updating of credit on the users premises by transmission of coded data by telephone. In such proposals, generally the franking machine is constructed to generate a sequence of codes, one being used at each credit updating. The postal authority provides to the user, via the telephone, data in encrypted form which includes the current code held in the franking machine. After decryption of the data, the machine compares the internal and entered codes and if they agree the credit value is updated.

Known methods of updating credit in franking machines have been based upon the postal authority having access either directly or via a telephone line with each individual franking machine licensed by the postal authority. While this is satisfactory for users with only a single franking machine, for users who have a number of franking machines the present methods are inconvenient and involve the user and the postal authorities in a large volume of financial accounting.

SUMMARY OF THE INVENTION

According to one aspect of the invention a franking machine system comprises a plurality of franking machines; a controller; first communication means between each said franking machine and said controller; said controller including register means to register a total value of credit available for the system and means operable to distribute amounts of credit via said first communication means to selected franking machines and to decrement said total value of credit registered by said register means by said distributed amounts of credit.

Preferably the controller is provided with second communication means operable to communicate with a remote resetting computer to effect updating of the total value of credit in said register means.

According to another aspect of the invention a controller for a franking machine system as claimed in any preceding claim includes electronic accounting and control circuits; first register means for storing data relating to usage of each franking machine in the system; second register means for storing total value of credit available for distribution to said franking machines; communication means for communicating With said franking machines; said electronic accounting and control circuits being operable in response to a request for an amount of credit from one of said franking machines to read data from registers in that franking machine, to check said data, to transmit a credit update signal to that franking machine and to decrement said register means by said amount of credit.

Preferably the communication means is operable to communicate with a resetting centre computer to effect a credit update transaction whereby a new credit value is authorized and including means to enter said new credit value in the second register means.

BRIEF DESCRIPTION OF THE DRAWING

An embodiment of the invention will now be described by way of example with reference to the drawings in which.

DESCRIPTION OF THE PREFERRED EMBODIMENT

Figure 1:
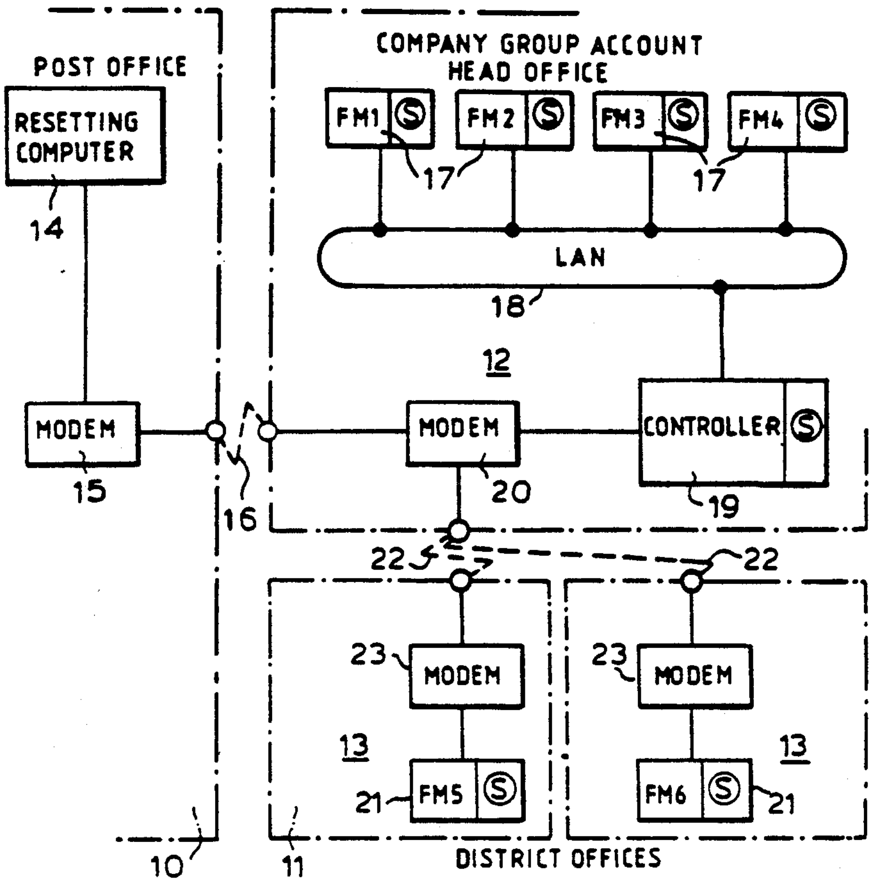
FIG. 1 shows a franking machine system having a plurality of franking machines coupled to a common controller in which the controller is used for transactions with a postal authority resetting center

Referring first to FIG. 1, a franking machine system is shown having a postal authority resetting center 10, a company or other organisation 11 which, as illustrated, consists for example of a main or head office 12 at one geographical location and branch offices 13 at other locations. The postal authority resetting center is equipped with a computer 14 with suitable data storage connected by means of a modem 15 to a telephone or data communications network 16. The main office 12 of the organisation has a plurality of franking machines 17 connected by means of a local area network 18 to a controller 19. The controller 19 is connected by means of a modem 20 to the telephone or data communications network 16. If the organisation also has branch offices 13, as illustrated in FIG. 1, these also may be equipped with franking machines 21. These franking machines 21 are connected to communication lines 22 by means of modems 23. The modem 20 at the main office 11 is also connected to the lines 22. It will be appreciated that the lines 22 may be public telephone network lines or private lines dedicated to communication between different locations of the organisation. The franking machines 17, 21 have electronic accounting and control circuits such as in currently available franking machines. In addition the franking machines are provided with input/output ports to enable data to be input from the controller 19 to the accounting and control circuits of the franking machines and to enable data to be output from the accounting circuits of the franking machines to the controller 19. A suitable form of input/output port and interface circuits has been described in our co-pending UK patent application No. 8708031 and U.S. patent application Ser. No. 07/17533S. It will be appreciated that the computer 14 at the postal authority resetting center is able to communicate via the telephone network with controllers located in other organisations having a plurality of franking machines connected to controllers or to individual franking machines.

As is usual, the franking machines 17, 21 each contain electronic accounting circuits and registers for maintaining a record of credit available for franking with that machine and a record of franking transactions. For these purposes a descending register registers the value of credit available for franking and the value is decremented for each franking transaction carried out by a user. An ascending register registers the accumulated value of franking used by the machine and a further register registers the count of items franked by the machine. The registers are duplicated in order to store multiple copies of each data value for reasons of maintaining the data in a secure manner. The accounting and control circuits are housed in secure sealed housings to prevent fraudulent use of the franking machines.

Usually when it is desired to enter credit in a franking machine, the postal resetting authority updates the value of credit held in the descending register by the amount of additional credit purchased and at the same time reads the current values held in the ascending register and the item count register. However in the present franking machine system, the controller 19 acts as a master in respect of remote credit updating. Credit purchased by the organisation is set into the controller by the computer 14 at the postal authority resetting center and this credit is subsequently distributed to the individual franking machines 17, 21 by the controller. Similarly the readings of the registers of the individual franking machines are read out by the controller and subsequently the data is transmitted by the controller to the postal authority computer 14. Thus updating of credit for use in the plurality of franking machines by the postal authority computer and the transmitting of data relating to usage of the franking machines is effected as a single transaction by the controller. Credit transfer from the controller to any franking machine 17, 21 in the system may be carried out in response to a request by a user of a particular franking machine or transfer of a preset credit amount may be initiated automatically when the descending register of the franking machine has descended to a preset low credit value.

Transmission of data between the controller and the postal authority computer and between the controller and the franking machines is carried out with suitable transmission protocols. For example if the controller is busy transacting a credit update or other data transfer with the postal authority computer, transaction requests from the franking machines to the controller are ignored. When the transaction with the postal authority computer is completed, transaction requests from the franking machines are accepted by the controller one at a time. Suitable clash avoidance techniques and messages are utilised in communication between the controller and the franking machines.

Figure 2:
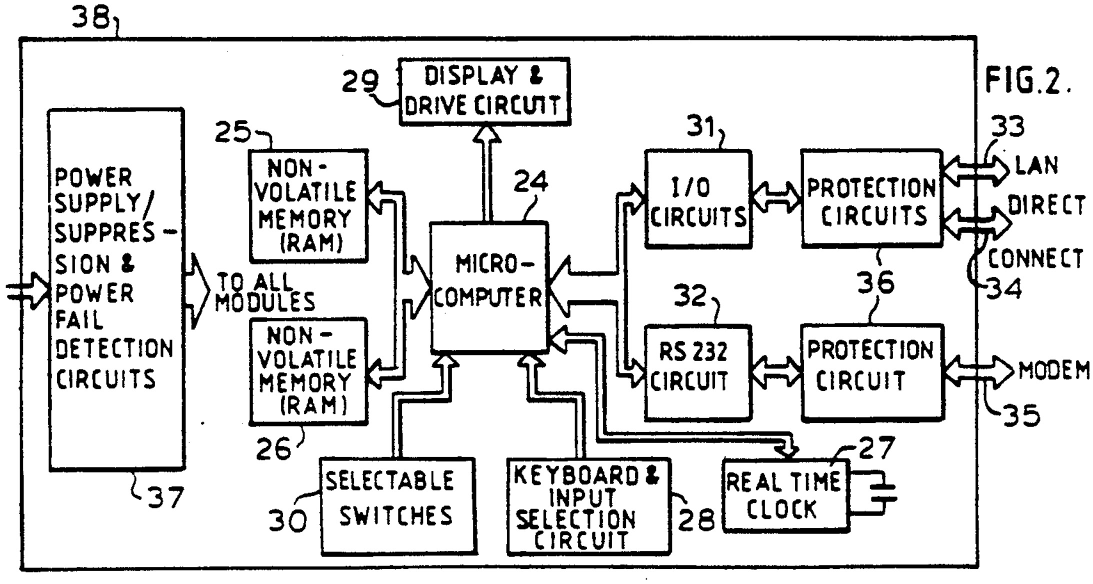
FIG. 2 is a block schematic diagram of the common controller shown in FIG. 1

Referring now to FIG. 2, the controller 19 comprises a micro-controller 24 containing program and working memories as well as control and arithmetic logic and input/output circuits. The program memory stores the application software code for carrying out the required operations of the controller. Dual non-volatile memories 25, 26 contain status registers for the controller as well as registers for storing all the credit and franking usage values of the system in accordance with the last transaction between the controller and any franking machine. A real time clock 27 is provided to enable transaction dates to be stored with the register values. A keyboard and associated circuit 28 enables a user to enter commands to the micro-controller. One such command may be to cause register values to be read and displayed on a digital display 29. Another command would cause the controller to enter remote resetting mode in which a request is transmitted to the postal authority computer for the issue of additional credit to the controller. A further command could be used to cause the controller to output data to a printer. Parameters of the franking machine system may be set in the controller at the time of installation by means of a set of manually operable switches 30. One such parameter is the number of franking machines connected in the system. Other parameters may include the mode of connection to each franking machine. If the parameters of the system are changed at any time, for example by the addition of further licensed franking machines, the switches 30 are reset to reflect the new parameters. Input/output circuits 31 are provided to enable the micro-controller 24 to communicate either directly or by means of a local area network 18 with the franking machines 17. Further input/output circuits 32 are provided to enable the micro-controller 24 to communicate via the modem 20 with the postal authority computer 14 and with other franking machines 21 connected via lines 22. Commonly available modems use a standard known as RS232 and hence the circuits 32 are arranged to conform to this standard to interface with commonly available modems. All external connections 33, 34, 35 from the input/output circuits 31, 32 are protected by means of protection circuits 36. These protection circuits provide protection from damage to the microcontroller 24 and the memories 25, 26 due to the application of excess voltage to the external connections. Such excess voltage may result from unintentional electrostatic discharge or may be as a result of fraudulent attempts to interfere with the contents of the memories. Suitable protection circuits are described in our co-pending application referred to hereinbefore. The electronic modules of the controller 19 are powered from a power supply 37 receiving power from the electricity mains. The power supply 37 is provided with suppression circuits to prevent mains borne interference from causing mal-operation of the controller. In addition the power supply 37 is provided with under and over voltage detection circuits to ensure that in the event of either condition, the micro-controller enters a routine whereby all circuits are set to a state such that data is not lost or corrupted. All the circuit modules forming the controller 19 are contained Within a secure enclosure 38 which is sealed by means approved by the postal authority to prevent unauthorized access to the circuit modules.

Figure 3:
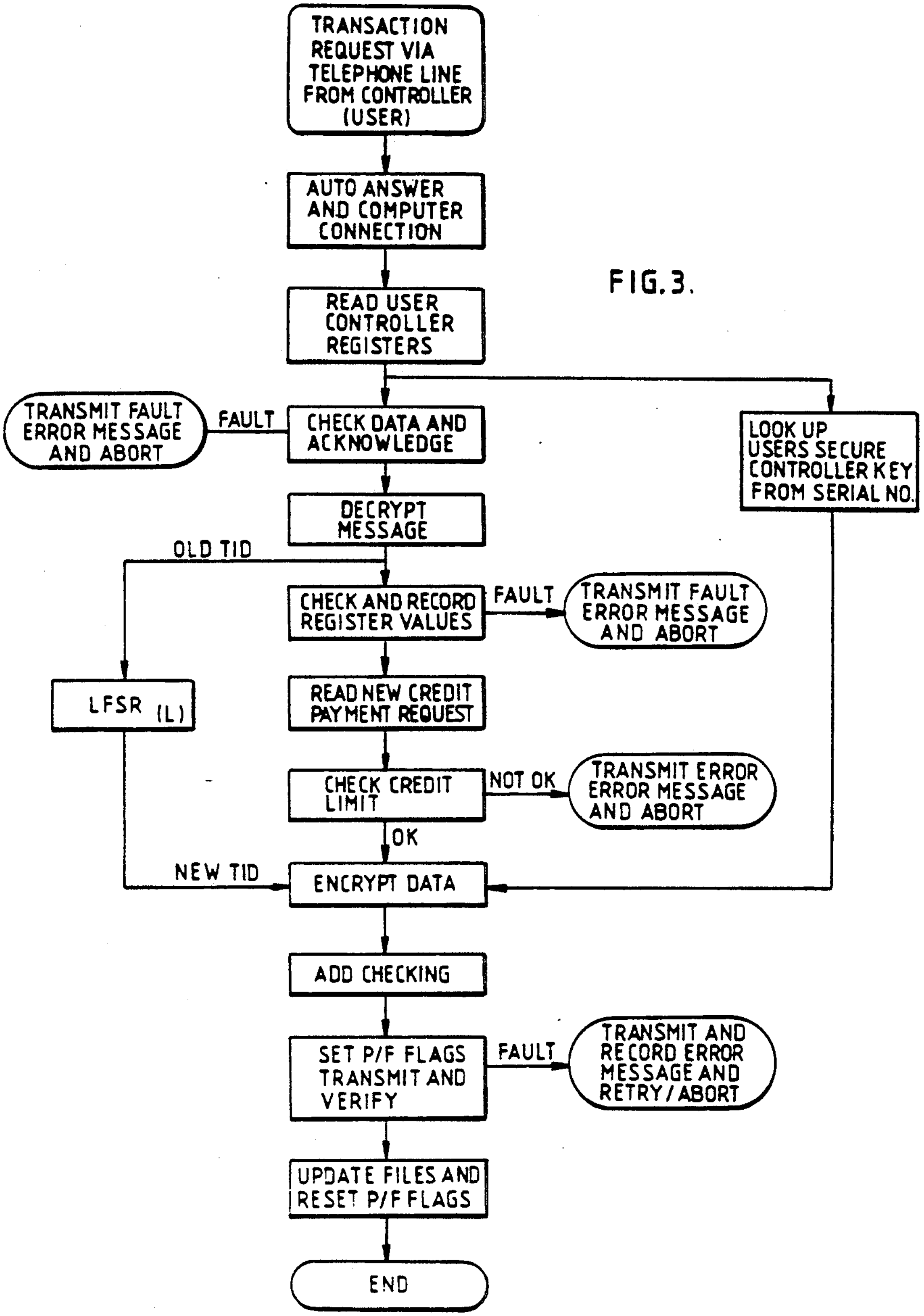
FIG. 3 is a flow diagram of operational steps in a transaction between the common controller and a postal authority computer

The flow diagram of FIG. 3 shows the sequence of steps carried out when it is desired to effect a transaction with the postal authority resetting center computer. The sequence is initiated by the user keying in a command on the controller keyboard 28 for the controller to enter the remote resetting mode and keying in a personal identity number. The controller stores personal identity numbers in the memories 25, 26 and the micro-controller compares the entered number with those stored in the memories. If the entered number is found to be an authorized number, the controller may automatically dial the telephone number of the resetting center to make a connection with the computer at the center. The computer 14 at the resetting center then requests the controller to transmit the serial numbers of all the franking machines in the system, corresponding register values, transaction dates, a transaction identification code and any other data required for recording and checking with existing data held by the resetting center computer. The controller encrypts this data and transmits it together with the serial number of the controller to the computer 14. The computer utilises the controller serial number to read a secure encryption key unique to that controller from a secure look up table. The encrypted data is checked for errors in transmission and if any error has occurred a fault error message is returned to the controller for display on the display 29 and the transaction request is aborted. If the transmission is without error an acknowledgement is returned to the controller. The computer 14 utilises the encryption key read from the table and an algorithm using a first random table to decrypt the encrypted data. The computer checks and records the register values from the controller. If these values do not have the correct relationship with those values currently held by the computer a fault error message is returned to the controller and the transaction request is aborted. If the values are acceptable the controller is instructed to display a request for the user to enter a value of new postage credit payment required. This new value is checked against authorized limits and account status and if this is found to be acceptable the computer utilises the encryption key to encrypt a data block to be returned to the controller. This data block contains a new transaction identification code generated by a pseudo-random number generator such as a linear feed shift register, the new postage credit payment value and checking data. The controller on receipt of this encrypted data block, decrypts it and updates its registers including updating the descending register with the current new value of credit available for distribution to the franking machines in the system. Time limits are preset for the various interactive sequences of the computer 14 and the controller 19 and tests are carried out to determine if these time limits are exceeded for any of the sequences. If any time limit is exceeded the transaction is terminated. During critical sequences of the transaction, power fail flags (P/F) are used to ensure that satisfactory operation is completed when power is restored.

A similar sequence of operations is utilised to carry out a credit update transaction between the controller and any selected one of the franking machines in the system. Similar levels of security apply to transactions between the controller and the franking machines and to transactions between the controller and the resetting center computer. However it will be appreciated that different algorithms and secure keys are utilised in encrypting and decrypting for the two kinds of transaction.

Figure 4:
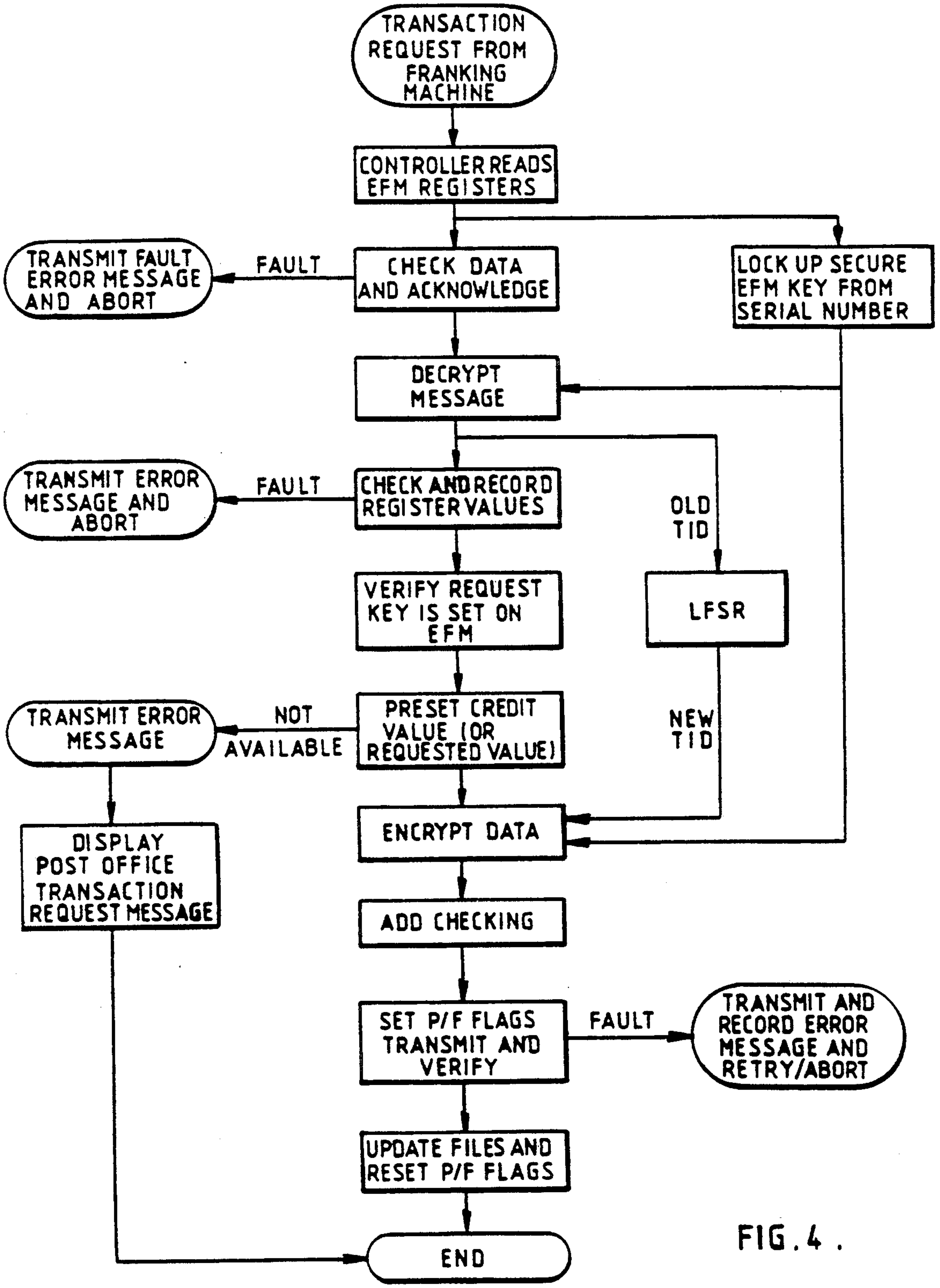
FIG. 4 is a flow diagram of operational steps in a transaction between the common controller and one of the franking machines and FIG. 5 is a block schematic diagram illustrating use of transportable memory units for communication between a resetting center and a controller and between the controller and a franking machine.

The sequence of operations for updating the credit value of a franking machine by the controller is shown in FIG. 4. The franking machine requiring credit updating transmits a transaction request to the controller. The initiation of the transaction request may be by manual intervention of a user or may be effected automatically upon the descending register of the franking machine being decremented to as preset minimum credit value. If the controller is not busy carrying out another transaction it reads the registers of the franking machine and from receipt of the serial number of the machine, the controller looks up a secure franking machine key unique to that particular franking machine. The data relating to register contents is encrypted by the franking machine prior to transmission to the controller and is decrypted by the controller utilising the secure franking machine key and an algorithm using a second random table. The register values received by the controller are checked against values currently held by the controller and the new received values are recorded. The controller then verifies that the request for credit update key on the franking machine is set. The controller may be programmed to issue preset amounts of credit to the franking machines or to issue amounts of credit as requested through the franking machines. The amount of credit required for the transaction is checked against the total amount of credit available for distribution by the controller. If the amount is available the secure key is utilised by the controller to encrypt a data block containing the value of credit update, a new transaction identification code generated by a pseudo random number generator and checking data. This is transmitted to the franking machine which is thereby enabled to update its descending register. If the amount of credit required by the transaction is not available for distribution by the controller an error message is transmitted to the franking machine for display to the user and a transaction request message is displayed on display 29 of the controller to alert a user to the need to obtain new credit from the postal resetting authority. As will be seen from the flow diagram, error messages are generated in response to a checking step indicating an error.

The modems provided with the resetting computer, the controller and the franking machines for communicating via the telephone system may be stand alone devices connected by cables to the computer, controller and franking machines respectively or may be constructed as circuits housed internally of the computer, controller and franking machines.

Figure 5:
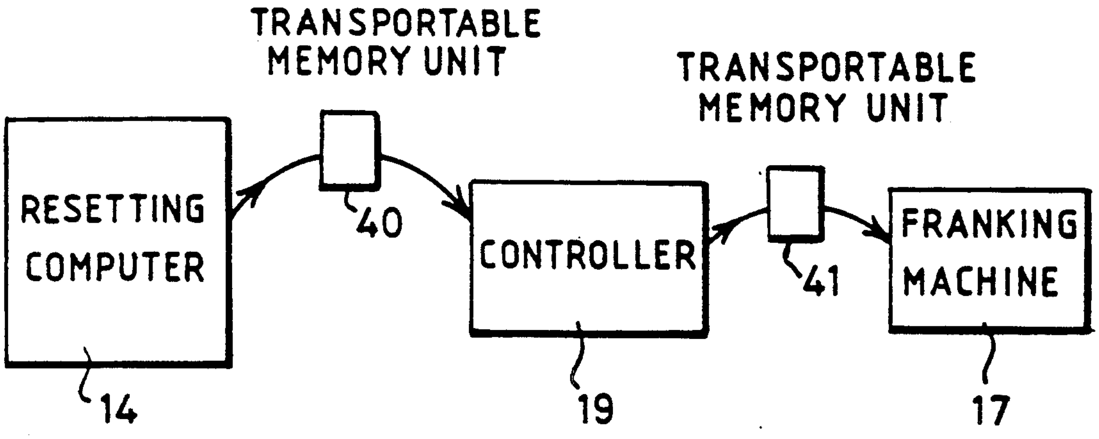

While the franking machine system described hereinbefore utilises the public telephone system to provide communication between the controller and the resetting computer it will be appreciated that other methods of communication may be used. For example a transportable memory unit such as described in our UK patent application 8510096 and corresponding U.S. patent application Ser. No. 853,928 (U.S. Pat. No. 4,757,532) could be used. Referring to FIG. 5 a memory unit 40 would be written with data by the resetting computer 14 for updating credit in the controller 19 and accounting data relating to the use of the franking machines 17 controlled by the controller 19 would be written into the memory unit 40 for transmission to the resetting computer 14. Similarly a transportable memory unit 41 could be utilised as a communication device between the controller 19 and the franking machines 17.

What is claimed is:

1. A franking machine system comprising:

a group of franking machines including at least a first franking machine and a second franking machine;

a remote resetting computer, a controller;

first communication means providing communication between said controller and each of said franking machines in said group of franking machines;

second communication means providing communication between said controller and said remote resetting computer;

said remote resetting computer being operable to transmit a total credit update signal via said second communication means to said controller;

said controller including:

data storage means to register a total value of credit available for distribution to said franking machines of said group of franking machines;

accounting means to transmit first credit signals relating to a first credit update amount corresponding to a first portion of said total value of credit via said first communication means to said first franking machine to effect input of said first credit update amount to said first franking machine and to decrement said total value of credit registered by said data storage means by said first credit update amount to a first updated total value of credit, and to transmit second credit signals relating to a second credit update amount corresponding to a second portion of said first updated total value of credit via said first communication means to said second franking machine to effect input of said second credit update amount to said second franking machine and to decrement said first total value of credit registered by said data storage means by said second credit update amount to a second updated total value of credit available for subsequent distribution to said franking machines for subsequent distribution to said franking machines of said group of franking machines and said accounting means of said controller being responsive to reception of said total credit update signal to increment the total credit value registered in said data storage means.

2. A franking machine system comprising:

a plurality of franking machines including at least a first franking machine and a second franking machine, said first franking machine storing a first value of credit for use by said first franking machine in franking mail items and said second franking machine storing a second value of credit for use by said franking machine in franking mail items;

a remote resetting computer;

a controller;

first communication means providing communication between said controller and each franking machine of said plurality of franking machines;

second communication means providing communication between said controller and said remote resetting computer;

said remote resetting computer being operable to transmit a total credit update signal via said second communication means to said controller each said franking machine being controllable to send a credit request message representing a required credit update value to said controller via said first communication means;

said controller including:

data storage means registering a value of total credit available for distribution to said franking machines;

accounting means responsive to a first credit signal request message representing a first required credit update value from said first franking machine to check said first required credit update value against said value of total credit registered in said data storage means and, if said value of total credit currently registered is not less than said first credit required credit update value, transmitting a first credit update signal relating to said first required credit update value via said first communication means to said first franking machine to update said first value of credit stored by said first franking machine and to decrement the value of total credit registered in said data storage means by said first required credit update value to cause said data storage means to register a first decremented value of total credit available for subsequent distribution to said franking machines, and said accounting means being responsive to a second credit request message representing a second required credit update value from said second franking machine to check said second required credit update value against said first decremented value of total credit registered in said data storage means, if said first decremented value of total credit currently registered is not less than said second required credit update value, transmitting a second credit update signal relating to said second required credit update value via said first communication means to said second franking machine to update said second value of credit stored by said second franking machine and to decrement said first decremented value of total credit registered in said data storage means by said second required credit update value to cause said data storage means to register a second decremented value of total credit available for distribution to said franking machines of said plurality of franking machines and said accounting means of said controller being responsive to reception of said total credit update signal to increment the total credit value register in said data storage means.

3. A franking machine system as claimed in claim 2 wherein the first communication means includes a unit including a memory; said memory being written with the credit update value by the controller and, after said unit is transported to the selected franking machine, the memory is ready by said selected franking machine to engage updating of the value of credit registered by the one franking machine.

4. A franking machine as claimed in claim 2 wherein said second communication means includes a unit including a memory; said memory being written with a total credit update amount by the remote resetting computer and, after said unit is transported to the controller, said memory is read by the controller to enable updating of the value of total credit registered by the storage means of the controller.

5. A franking machine system as claimed in claim 2 wherein the credit request message from the franking machines includes a first transaction identification code unique to the specific one of said franking machines sending said credit request message; the accounting means of the controller and said specific franking machine each generate a second transaction identification code related to said first transaction identification code; the accounting means of the controller transmits the credit update signal including said second transaction identification code to said specific franking machine from which the credit request message is received and said specific franking machine is operative to update the credit value stored therein in response to the second transaction identification code in the credit update signal corresponding to the second transaction identification code generated by said specific franking machine.

6. A franking machine system as claimed in claim 5 wherein the controller includes means to store a third transaction identification code unique to said controller and unique to a credit updating operation; the second credit update signal from the resetting center to said controller includes said third transaction identification code unique to said controller; and the accounting means of said controller is operative to compare the third transaction identification code included in the second credit update signal with the stored third transaction identification code and if said third transaction code included in the second credit update signal and said stored third transaction code correspond to increment the total value of credit registered in the storage means.

7. A method of updating credit registered in a plurality of franking machines including at least a first franking machine and a second franking machine, the method including the steps of:

providing a controller registering a bulk value of credit available for distribution to said franking machines;

providing first communication means between said controller and a resetting center;

providing second communication means to connect said franking machines to said controller;

causing the resetting center to send a bulk credit update signal via said first communication means to said controller to increment said bulk value of credit registered in said controller;

causing said controller to respond to a first credit update request for a first credit update value received via said second communication means from said first franking machine by transmitting a first credit signal to said first franking machine to update a first value of credit registered by said first franking machine by the amount of said first credit update value and causing said controller to decrement said bulk value of credit by the amount of said first credit update value to a first decremented bulk value of credit, and causing said controller to respond to a second credit update request for a second credit update value received via said second communication means from said second franking machine by transmitting a second credit signal to said second franking machine to update a second value of credit registered by said second franking machine by the amount of said second credit update value and causing said controller to decrement said first decremented bulk value of credit by the amount of said second credit update value to a second decremented bulk value of credit for subsequent updating of credit of said franking machines of said plurality of franking machines.

* * * * *